United States Patent
Lindstrom et al.

(10) Patent No.: US 6,881,604 B2
(45) Date of Patent: Apr. 19, 2005

(54) METHOD FOR MANUFACTURING NANOSTRUCTURED THIN FILM ELECTRODES

(75) Inventors: Henrik Lindstrom, Uppsala (SE); Sven Sodergren, Uppsala (SE); Sten-Eric Linquist, Uppsala (SE); Anders Hagfeldt, Bjorklinge (SE)

(73) Assignee: Forskarpatent i Uppsala AB, Uppsala (SE)

(*) Notice: Subject to any disclaimer, the term of this patent is extended or adjusted under 35 U.S.C. 154(b) by 0 days.

(21) Appl. No.: 10/685,540

(22) Filed: Oct. 16, 2003

(65) Prior Publication Data

US 2005/0003643 A1 Jan. 6, 2005

Related U.S. Application Data

(63) Continuation-in-part of application No. 09/991,715, filed on Nov. 26, 2001, now abandoned, which is a continuation-in-part of application No. PCT/SE00/01060, filed on May 25, 2000.

(30) Foreign Application Priority Data

May 25, 1999 (SE) .............................................. 9901886

(51) Int. Cl.$^7$ .............................................. H01L 51/40
(52) U.S. Cl. .......................... 438/99; 438/409; 438/610
(58) Field of Search .......................... 438/99, 409, 507, 438/610, 679, 685

(56) References Cited

U.S. PATENT DOCUMENTS

| | | | | |
|---|---|---|---|---|
| 4,054,478 A | | 10/1977 | Linnon ........................ | 438/455 |
| 5,616,366 A | | 4/1997 | Olsen et al. ................ | 427/508 |
| 5,801,092 A | * | 9/1998 | Ayers .......................... | 438/623 |
| 6,025,034 A | * | 2/2000 | Strutt et al. ................ | 427/450 |
| 6,217,843 B1 | | 4/2001 | Homyonfer et al. ........ | 423/593 |
| 6,312,971 B1 | | 11/2001 | Amundson et al. ........... | 438/99 |
| 6,413,882 B1 | * | 7/2002 | Leung et al. ................ | 438/781 |
| 6,447,848 B1 | | 9/2002 | Chow et al. ................ | 427/446 |
| 2002/0006470 A1 | | 1/2002 | Eberspacher et al. ....... | 427/216 |

FOREIGN PATENT DOCUMENTS

| | | |
|---|---|---|
| JP | 8-78636 | 3/1996 |
| WO | 94/21744 | 9/1994 |

* cited by examiner

*Primary Examiner*—Chandra Chaudhari
(74) *Attorney, Agent, or Firm*—Young & Thompson

(57) ABSTRACT

A method for a binder-free manufacturing a nanostructured porous film, e.g. for use in solar cells, includes the steps of preparing a suspension of semi-conducting nanometer-sized particles in a volatile suspending agent (21), depositing the particle suspension on a conducting substrate, removing the suspending agent by evaporation (31), thereby leaving a particle layer on said substrate and compressing (P) the deposited particle layer for mechanical and electrical interconnection.

17 Claims, 2 Drawing Sheets

METHOD FOR MANUFACTURING NANOSTRUCTURED THIN FILM ELECTRODES

CROSS REFERENCE TO RELATED APPLICATIONS

This application is a continuation-in-part of application Ser. No. 09/991,715, filed on Nov. 26, 2001 now abandoned. Application Ser. No. 09/991,715 is the continuation-in-part of PCT International Application No. PCT/SE00/01060 filed on May 25, 2000 under 35 U.S.C. § 371. The entire contents of each of the above-identified applications are hereby incorporated by reference.

TECHNICAL FIELD OF THE INVENTION

The present invention relates to a method for manufacturing nanostructured thin film electrodes, and more specifically to a method for producing a nanostructured porous layer of a semi-conductor material on a substrate for use in an electrochemical or photoelectrochemical cell, such as a solar cell, display, battery etc.

PRIOR ART

The basic concept of nanostructured thin films is described by B. O'Regan and M. Grätzel in Nature, 353, 737 (1991), and by Grätzel et al in J. Am. Chem. Soc., 115, 6382 (1993).

The application of nanostructured thin films in displays is described by A. Hagfeldt, L. Walder and M. Grätzel in Proc. Soc. Photo-Opt. Intrum. Engn., 2531, 60 (1995).

A method for manufacturing multiple sintered porous layers is described by A. Kay and M. Grätzel in Sol Energy Mat. Sol. Cells, 44, 99 (1996).

Numerous patents related to the nanostructured film technique, including manufacturing methods including a firing step, are issued to Grätzel et al, such as U.S. Pat. No. 5,569,561, EP-A-0 333 641, U.S. Pat. Nos. 5,350,644, 5,525,440, 5,441,827 and 5,084,365. A screen printing technique is included in, for instance, U.S. Pat. No. 5,830,597 to Grätzel.

In U.S. Pat. No. 4,054,478 is described a method for manufacturing a thin film assembly of multiple layers of thermoelectric and insulative materials. The films are formed separately as individual sheets, and are then stacked in a press, wherein they are subjected to heat and pressure.

In U.S. Pat. No. 5,616,366 is described a method for making an electrode current collector assembly. An electrode composition is mixed with a volatile casting solvent, and is coated onto a substrate. Then an electrolyte composition is applied to the electrode composition. The volatile casting solvent is driven off by heating. After a step of compression, the electrode and electrolyte compositions are cured.

TECHNICAL BACKGROUND

In many applications wherein electrochemical or photoelectrochemical cells are used, such as in solar cells or data displays, there is a need to expose an electrolyte to a very large electrode area. This could be expressed such that the electrode should exhibit a very high surface to volume ratio.

A useful method to achieve a high surface to volume ratio electrode is to manufacture an electrode in the form of a nanostructured film, i.e. a network of interconnected particles of nanometer size. The porosity of such a film is typically in the range of 50–60%. The particles are typically of a semiconductor material, such as a metal oxide, and the particle size is typically within the range of from a few nanometers up to several hundred nanometers. The thickness of a nanostructured film is typically in the order of 5–10 $\mu$m, but may be up to several hundred $\mu$m.

The electrode film is deposited on a substrate, such as a glass sheet. However, the nanostructured film must be electrically connected to peripheral devices. Since the substrate typically is an insulator, a conducting layer is provided on the substrate and the nanostructured electrode is deposited on the conducting layer. A substrate (e.g. glass) coated with a conducting layer is called a conducting substrate (such as a conducting glass).

The function of the nanostructured film depends on the application. For example, in a solar cell the function of the nanostructured film is to collect electrons from an excited state produced when light is being absorbed in dye molecules attached to the surface of the nanostructured film. The electrons are transported through the particle network of the film to the conducting substrate where the photocurrent is collected. In display applications, on the other hand, the nanostructured film is useful to deliver electrons to surface attached dye molecules or to the nanostructured surface in itself to accomplish intercalation of, for instance, lithium ions. By changing the electrical potential of the conducting substrate the apparent color of the nanostructured film is controlled.

There are several previously known methods for manufacturing nanostructured films. Common to most of them is that the semiconductor material is applied to the conducting substrate in the form of very small particles, typically with a size of a few nanometers, present in a colloidal solution. These small particles are physically and electrically connected using a firing process. The firing process is performed at a temperature of several hundred degrees and for a time period of, typically, half an hour.

Actually, in addition to the firing process described above, conventional methods for forming nanostructured films include several steps, each step often rather time and cost consuming. For example, a colloidal solution preparation step includes measures to ensure a low degree of particle aggregation, such as adding organic additives. Thus, the firing process is needed not only to connect the particles, but also to remove the anti-aggregating organic additives in the colloidal solution by combustion. Furthermore, a film deposition step may include the use of screens to pattern or limit the extension of the film.

The firing step of conventional methods for forming nanostructured films also sets limits to the choice of substrate material. The high firing temperature, especially in combination with a long dwell time, rules out plastics as substrate materials.

The method of U.S. Pat. No. 4,054,478 is an example of a method that requires an intermediate step wherein particles are temporarily connected using a binder in order to provide a structural stability to a film of particles. The binder then has to be removed using a high temperature (such as 350–400° C.) treatment during a step of compression.

The method of U.S. Pat. No. 5,616,366 concerns the manufacturing an electrode current collector assembly wherein a solid electrolyte is used, i.e. the electrodes are not of the nanostructured technique to which the present application is aimed. However, the method of U.S. Pat. No. 5,616,366 is an example of a presently known technique requiring a curing step, in addition to a compressing step, for forming an electrode film.

Therefore, there is a need for a fast nanostructured film manufacturing method that does not require a heat treatment step and thereby allows for the use of a wide range of substrate materials.

SUMMARY OF THE INVENTION

It is an object of the present invention to provide an improved method to coat a conducting substrate with a nanostructured porous film.

This object is achieved with the method according to claim 1.

The method of the invention is useful for providing a conducting substrate with a thin nanostructured porous film at a substantially shorter process time than has been possible previously. The reason for this is that no non-volatile substances are needed to mix with the electrode particle material, such substances generally used with previously known methods. Therefore, no long time, high temperature firing is needed to remove such non-volatile substances. In addition, no curing step is necessary.

Thus, with the method of the invention it is possible to use a wider range of substrate materials, i.e. materials having temperature properties that would make them unsuitable for a long lasting firing process, such as plastics. Further advantages with the method of the invention are described below.

BRIEF DESCRIPTION OF THE DRAWINGS

The invention shall now be described in more detail, with reference to the attached drawings wherein.

DETAILED DESCRIPTION OF EMBODIMENTS

Generally, according to the invention a nanostructured porous film is produced with a method wherein a suspension of electrode material particles in a suspending agent is prepared, the particle suspension is deposited on a conducting substrate, the suspending agent is removed, typically at ambient conditions, thereby leaving a particle layer on said substrate and the particle layer is compressed, typically at ambient conditions, to form an electrically conducting and mechanically stable nanostructured porous film on the conducting substrate.

Figure 1:
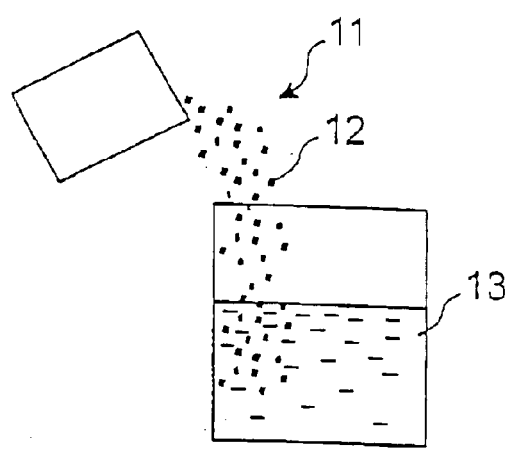
FIG. 1 is a schematical view showing preparation of a particle suspension, according to a step of the present invention.

In the suspension preparing step according to the invention, as is illustrated schematically in FIG. 1, a powder 11 consisting of particles 12 of a material selected to form the nanostructured film is added to a suspending agent 13. Of course, particles of more than one suitable material could be used as well, but in order to provide an easy-to-read description, only the case of one material will be described hereinafter.

The electrode particle material 11 is selected among any suitable conducting or semi-conducting material having the ability to form a film when compressed, such as metal oxides like $TiO_2$, $ZnO$, $Nb_2O_5$, $ZrO_2$ and $SnO_2$. Of course, mixtures of different materials are possible, such as $TiO_2$ mixed with carbon or $Fe_2O_3$.

Suitable particle sizes are within the nanometer range, i.e. up to 1000 nanometer. Preferably, the major part of the particles should have a size in the range of 10–100 nanometer. The particles are added to the suspending agent, typically to a content of appr. 20% by weight. However, it has been found that adding a small amount (up to appr. 1% by weight) of particles of larger size, typically in the range of 1–10 $\mu$m (approximately corresponding to the thickness of the particle layer applied) improves the smoothness of the resulting nanostructured film. Furthermore, adding larger particles also reduces the tendency of the smaller particles to stick to the tool providing the pressure in the compressing step (to be described below).

A specific advantage with the present invention is that it is not critical to obtain a colloidal solution.

Useful suspending agents 13 are found among any suspending agents having low surface tension and being volatile under ambient conditions. Preferred examples on such suspending agents are ethanol, methanol and acetone. For environmental and health reasons, water may also be preferred as the suspending agent. This is possible with the method of the present invention, and is another specific advantage.

Figure 2:
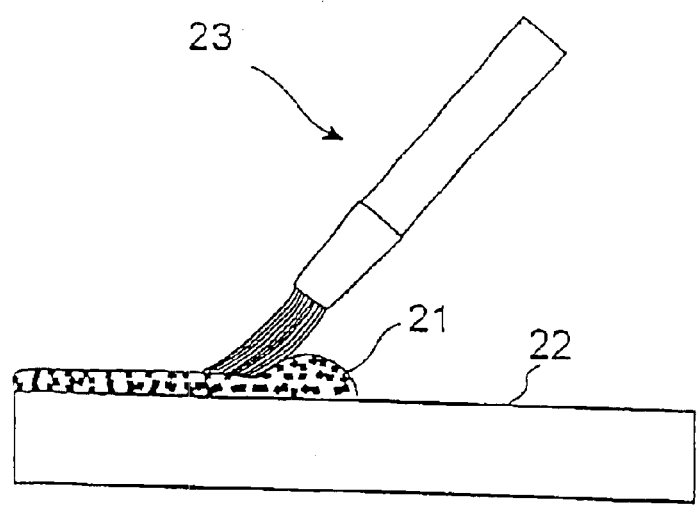
FIG. 2 is a schematical view showing the deposition of the particle suspension on a substrate, according to another step of the present invention.

In the depositing step according to the invention, as is illustrated schematically in FIG. 2, the suspension 21 is deposited on a conducting substrate 22 such as a glass or plastic sheet coated with F-doped $SnO_2$, ITO (i.e. Sn-doped $In_2O_3$) or Al-doped ZnO. An example of a suitable conducting glass is "Tec 8" supplied by Hartford Glass Co, Inc. Examples of suitable plastic substrates are "PF-65IN-1502" supplied by Delta Technologies or "ITO-60" supplied by Innovative Sputtering Technology (IST). The deposition is performed using any suitable conventional method, such as spraying or brush 23 application. In order to achieve a smooth nanostructured film care should be taken to apply the suspension evenly, on a micrometer scale, on the substrate.

Figure 3:
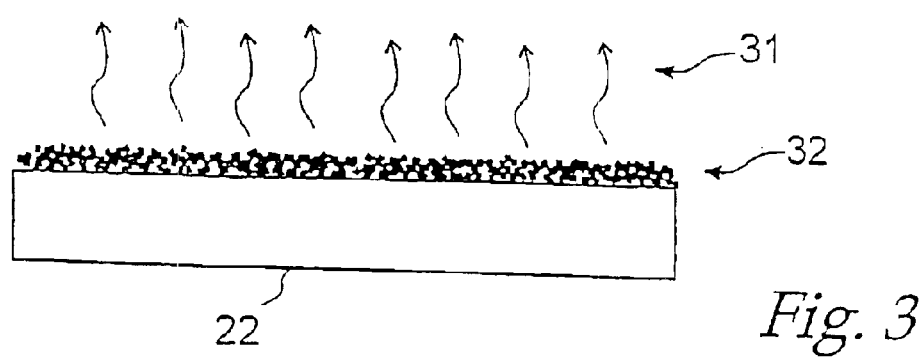
FIG. 3 is a schematical view showing the removal of the suspending agent of the suspension, according to another step of the present invention.

The step, according to the invention, of removing the suspending agent, as is illustrated schematically in FIG. 3, is simply based on the fact that a volatile suspending agent evaporates 31 during favorable conditions of pressure, temperature and ventilation to leave the particles of the suspension as a particle layer 32 on the conducting substrate 22. When using a very volatile suspending agent, such as acetone, the step of removing the suspending agent occupies a time interval of only a few minutes or less, even at room temperature and ambient pressure provided good ventilation. Of course, proper ventilation is also necessary in the case that a suspending agent exhibiting risks for health or environment is used, in which case the suspending agent preferably is recovered in a suspending agent recovery facility. If so is desired, it is possible to shorten the processing time for removing the suspending agent with raised temperature, reduced pressure and/or forced ventilation. This is especially preferred in the case of water being used as the suspending agent.

In one embodiment (not shown) of the present invention, the steps of depositing the suspension and removing the suspending agent are combined using a roller, on the surface of which the suspension is first distributed. Then, in a subsequent operation, the roller is rotated to deposit the suspension onto the substrate, or the remaining particle layer in the case that the volatile suspending agent has already vaporized before the particle layer have been deposited on the substrate.

Figure 4:
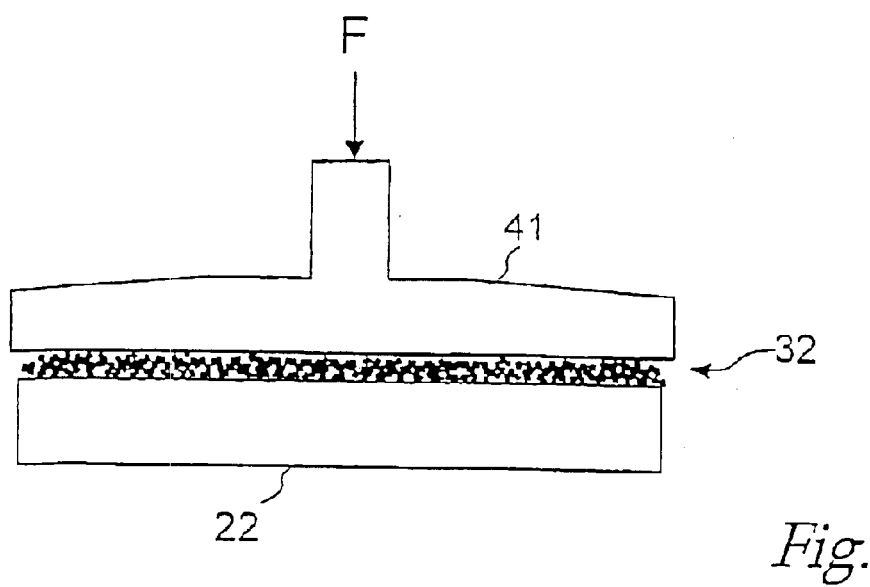
FIG. 4 is a schematical view showing the compression of the particle layer remaining on the substrate, according to another step of the present invention.

The step of compressing the particle layer deposited on the substrate to form a thinner but still porous film, as is illustrated schematically in FIG. 4, has several important aspects. For example, it is necessary to ensure a proper electrical contact between adjacent particles within the film as well as between particles and the conducting layer of the conducting substrate, to enable electron transport from any particle via the conducting layer to a current collecting device coupled to the conducting substrate. By applying a pressure on the deposited particle layer, the particles are forced together and at the same time they are pressed toward the conducting layer, to achieve sufficient contact areas to enable the resulting porous film to act as an electrical conductor. The compression also provides a mechanical stability to the film. Thereby, the film sticks to the conducting substrate and exhibits sufficient strength to withstand subsequent handling.

Thus, according to the invention, when using sufficiently small particles, i.e. particles less than 1000 nanometer, no binder will be necessary in addition to the compression to achieve a sufficiently strong mechanical adherence between the particles, and between particles and the conducting layer.

Furthermore, to achieve a high surface to volume ratio for the porous film, it is necessary to break the particle aggregates used with the method of the invention into smaller aggregates or particles. Using a proper pressure transferred to the particle layer with a pressure tool of sufficient hardness, the particles are broken into such smaller pieces, preferably having a size in the range of a few nanometers up to several hundred nanometers.

The compression could be performed at ambient conditions, apart from any precautions necessary for health reasons.

It should be noted that it is not necessary to remove the suspending agent completely before the compressing step. A small amount of the agent remaining in the particle layer is not critical for the success of the compressing step.

Figure 5:
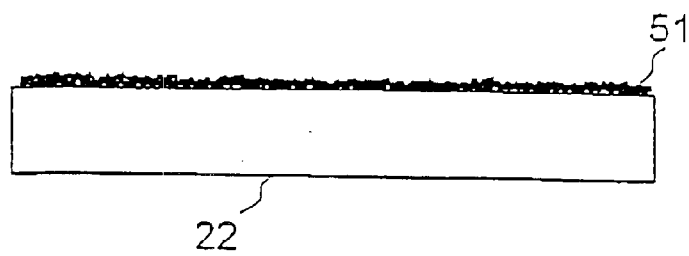
FIG. 5 is a schematical view showing the nanostructured porous film after compression.

In the case of comparatively small substrates, such as 10 cm×10 cm substrates, the compressing step, as shown in FIG. 4, is preferably performed using a very simple method wherein a steel pressure plate 41 is lowered at a selected compressing force F onto the particle layer 32 deposited on the substrate 22. After compression, a mechanically stable nanostructured film 51 coats the substrate 22 (FIG. 5).

Figure 6:
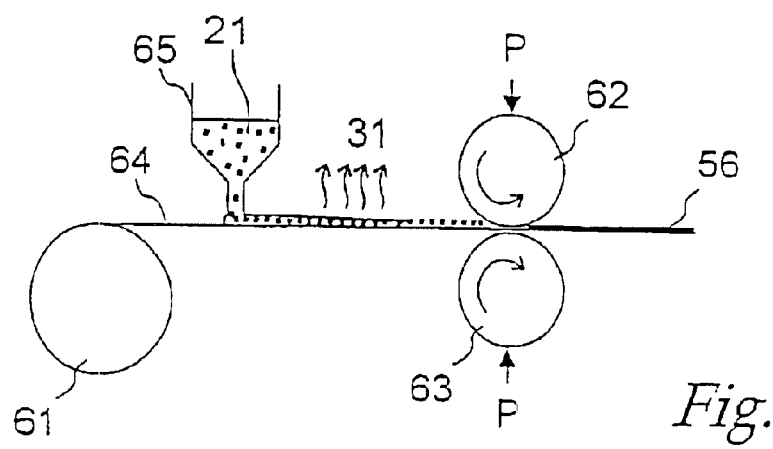
FIG. 6 is a schematical view illustrating the steps of the present invention used in a continuous production line.

In the case of substrates of larger dimensions, such as conducting plastic films provided from rolls, it is preferred to perform the compressing step on a continuous basis using a roller mill, as illustrated schematically in FIG. 6.

In the embodiment shown in FIG. 6, a roll of conducting substrate 61, i.e. a roll of a flexible material, such as a plastic film provided with an electrically conducting film on the side to be provided with the electrode, is arranged to supply a continuous web of conducting substrate into the nip between two pressure rollers 62, 63. The rollers 62, 63 rotate towards each other in order to feed the conducting substrate web 64 pass the rollers, and are mutually compressed with a force P calculated to provide a proper pressure to the substrate to form a nanostructured film, as will be described. A receptacle 65 accommodates the particle suspension 21. The suspension 21 is poured onto the web 64 at a distance before, with respect to the feeding direction of the web, the rollers and in such a way that it flows out evenly onto the web. Consequently, the suspension follows the web towards the rollers but on its way the volatile suspending agent evaporates 31, leaving the bare particles on the web. When passing the nip of the rollers, the particle layer are compressed to form a nanostructured porous film 56 covering the substrate, as described above.

In order to avoid adhesion between the particles and the pressing tool, it is preferred to provide the pressing tool with a surface material exhibiting poor adhesion to the particles, such as stainless steel, gold, or fluorinated polymers such as polytetrafluoroethylene (PTFE), PVDF, PVDC or low density polyethylene. Alternatively, a thin film of a non-adhesive material, such as a 50 μm aluminum foil, could be disposed upon the particle film before pressing, in order to separate the particles from the pressing tool. After pressing, the separating film is removed.

A sequence of steps shall now be described to exemplify the practicing of an embodiment of the present invention.

Experiment 1

The conducting substrate was a "Tec 8" supplied by Hartford Glass Co, Inc. and consisted of a 10 cm×10 cm×3 mm soda lime glass sheet coated with a conducting layer of fluorine doped tin oxide of 8 ohm/cm$^2$ resistivity. A suspension was prepared by adding 20% by weight $TiO_2$ particles (Degussa P25) to ethanol. The suspension was applied to a thickness of 50 μm onto the conducting layer by brush application. The ethanol was allowed to evaporate to the air, and a 50 μm thick separating film of aluminum foil was draped on the particle layer. The assembly consisting of substrate, particle layer and separating film was placed between two planar stainless steel plates. A pressure of 300 kg/cm$^2$ was applied on the assembly via the steel plates, to achieve a nanostructured film of appr. 55% porosity.

Then, the experiment above was repeated with new substrates, varying the pressure within 100–1000 kg/cm$^2$. Thereby, the porosity achieved varied within appr. 50–60%, the higher the pressure the lower porosity. Also the mechanical stability and the film thickness varied in response to the pressure applied. Optimal properties of the nanostructured film were obtained for a pressure of appr. 500 kg/cm$^2$.

End of the Experiment 1

Experiment 2

In another experiment a 5 cm×5 cm×0.2 mm conducting plastic substrate was used. The substrate was cleaned using a laboratory detergent "RBS 25" supplied from Labkemi. The preparation and application of the suspension was performed in the same way as the experiment described above. The ethanol was allowed to evaporate in air and a 25 μm thick separating film of low density polyethylene was draped on the particle layer. The film was compressed in the same manner as described in the experiment above, with the exception that the applied pressure was 1000 kg/cm$^2$.

End of the Experiment 2

The method according to the invention to produce a nanostructured porous electrode has numerous advantages with respect to prior art methods. These advantages are mainly due to the fact that the method does not involve the use of a binder to temporarily or permanently bind the electrode particles. Such a binder, for example a polymer solved in a solvent or a wax, is both costly and requires a firing step, as well as (in some cases) a time period for curing.

For example, the step of preparing a suspension is simple and fast and preferably makes use of cheap and commercially available suspending agents only. The suspending agents may be selected based on environmental and health considerations. Since it is not critical to ensure the absence of particle aggregations, there is no need for adding components to inhibit the formation of particle aggregates. The particles are added in a pulverized state commercially obtainable at low cost.

The step of depositing is easily made using simple methods due to the low-viscous consistency of the suspension, and is well suited for automation.

The step of removing the suspending agent is very easy when a volatile suspending agent is used. By recovering the vaporized suspending agent the cost of the suspending agent could be held very low, at the same time as environmental and health risks are reduced.

The step of compressing the deposited film to achieve a thin but still porous film is also performed using simple techniques. An especially important feature is the possibility to achieve a mechanically stable and electrically conducting nanostructured porous film at room temperature. Therefore, it is possible to select the substrate from a wider range of materials than is possible with a conventional firing technique. This opens up for the use of plastic materials that offer cheaper substrates, the possibility to manufacture large electrodes, the possibility to manufacture numerous electrodes on one large substrate to be cut at a later stage and even the possibility of easy manufacturing of non-planar electrodes.

However, although no firing step is necessary for forming the nanostructured layer, firing in different forms may in special cases give some additional advantages.

The particles may be fired in the presence of air in a separate step before they are mixed with the suspending agent. This firing process can be performed, for example, by heating the particles at temperatures above 100° C. in the presence of air in an oven. This firing of the particles before suspension preparation may be useful as a purification method in cases when the particles are contaminated by impurities that can be removed by firing. The rationale for removing the impurities is that impurities in some cases may cause poor electrical and mechanical contact between adjacent particles within the film as well as causing poor electrical and mechanical contact between the particles and the conducting layer of the conducting substrate. Furthermore, separate firing of the particles before suspension preparation may also be useful to increase the degree of particle crystallinity in cases where the commercial particles initially are in an amorphous state.

Also the conducting substrate may be fired separately in the presence of air before the suspension is deposited onto the conducting substrate. Firing of the conducting substrate may be useful in cases where, for example, the conducting layer is contaminated by impurities that can be removed by a firing process. The rationale for removing impurities on the conducting layer is that impurities in some cases may cause poor electrical and mechanical contact between the particles and the conducting layer of the conducting substrate. Of course, in order to avoid destruction of the substrate material or the conducting layer, the firing temperature has to be adjusted by taking into account the heat resistance of the conducting substrate.

It is also possible to perform a heat treatment in air of the substrate with the deposited film before the compressing step as well as after. In order to avoid destruction of the substrate material or the conducting layer, the firing temperature has to be adjusted by taking into account the heat resistance of the conducting substrate. This is especially advantageous in applications wherein a post-treatment with a functional dye, or other molecules, is to be performed, a short firing step may then be performed to remove impurities from the surface of the particle layer. Such a firing step, which typically is performed by blowing hot air (appr. 400° C.) for a couple of minutes over the electrode material and therefore requires a substrate of sufficient heat resistance, is made after the step of removing the suspending agent, and preferably after the step of compression. Such a firing step also removes any remaining traces of the suspending agent.

An important advantage with the method of the present invention is the possibility of continuous manufacturing of the nanostructured porous film. This is most pronounced with the embodiment including flexible substrates, such as plastic film substrates, compressed in a roller mill. A structure, on the micro-scale, of the roller surface (such as a wavy profile cut along the longitudinal direction of the cylindrical surface of the roller) could be provided, and through the step of compression this structure would then be transferred to the nanostructured layer.

It is even possible to provide a pressurizing roller with a relief of a pattern to be reproduced on the nanostructured film. That is, a pattern to be transferred to the nanostructured film on the substrate is "printed" directly by the pressure from the roller, without the need for screens, while the loose particles remaining at the areas between the relief areas of the roller are flushed away. The pattern could, for instance, be segments, digits or letters for use with a display or a solar cell. Thus, in this embodiment the nanostructured porous film is formed at selected areas on the conducting substrate using a technique similar to embossed printing.

Furthermore, a major advantage of the method is that all the steps of the method are very fast, thereby allowing a very high throughput, especially when adopted in an automated process.

Actually, the steps of depositing the suspension, removing the suspending agent and press the particle film could be made in one cooperating operation by pouring a suspension, wherein the suspending agent is highly volatile, at the substrate feeding side of a roller in a roller mill for compressing the substrate/particle assembly. To enhance the evaporation of the suspending agent, the ventilation and the temperature surrounding the roller mill should be selected to remove the suspending agent from the particles approximately at the short time necessary for the particle layer to enter the nip of the upper and lower rollers of the roller mill. Warming the roller facilitates the removal of the suspending agent. Thus, extremely high throughput is possible.

Furthermore, compared to a conventional method requiring high-temperature firing and removal of organic additives, the method of the present invention requires less energy.

It is obvious that the present invention may be varied in many ways with respect to the detailed description above. Such variations are not to be regarded as a departure from the spirit and scope of the invention, and all such modifications as would be obvious to one skilled in the art are intended to be included within the scope of the following claims.

For example, the method, known in itself, for modifying the surface of the particles of the nanostructured film by depositing inorganic material, such as $TiCl_4$ in water solution, could be performed before the compressing step as well as after.

Furthermore, as is described above it is possible to treat the particles of the manufactured nanostructured film with organic dyes according to any method known within the art.

It is also possible to manufacture a nanostructured electrode consisting of several layers of nanostructured films, such as those described by Kay and M. Grätzel in Sol. Energy Mat. Sol. Cells, 44, 99 (1996). This is achieved by performing the suspension coating several times, either using a suspension of the same composition each time or varying the composition for one or several layers to obtain a film assembly of non-homogenous properties. The multiple layers may be compressed between each step of suspension coating, or they may be compressed in one single operation after all the separate layers have been applied. This is illustrated in Experiment 3 below.

Experiment 3

In another exemplifying experiment several stacked nanostructured layers were deposited onto a plastic substrate. The plastic substrate was a 5 cm×5 cm×0.175 mm "ITO-60" sheet supplied by IST (Innovative Sputtering Technology). A first layer of a nanostructured TiO2 film was deposited on the plastic film in the same manner as described in Experiment 2 above, with the exception that the suspension was applied to a thickness of 100 μm and the pressure applied was 1500 kg/cm.

In the next step, a suspension was prepared by mixing 40% by weight TiO2 powder ("Tioxide A-HR supplied by Huntsman) to ethanol. The second suspension was stirred with a magnetic stirrer for several hours and then applied onto the first layer to a thickness of 50 μm. The ethanol from the second layer was allowed to evaporate in air and a 25 μm thick separating film of low density polyethylene was draped onto the second particle layer. The second film was compressed by applying a pressure of 1000 kg/cm2.

In a third step a suspension was prepared by mixing 2.7% by weigt carbon powder ("Printex L" supplied by Degussa), 10.9% by weight graphite ("Carbon graphite powder, <325 mesh)" supplied by Alfa), and 4.9% by weight TiO2 powder ("P25" supplied by Degussa) to ethanol. The solution was stirred for 24 hours with a magnetic stirrer. The third solution was applied onto the second layer to a thickness of 50 μm. The ethanol from the third layer was allowed to evaporate in air and a 25 μm thick separating film of low density polyethylene was draped onto the second particle layer. The third film was compressed by applying a pressure of 1000 kg/cm2.

End of Experiment 3

What is claimed is:

1. A method for manufacturing a nanostructured porous film electrode, the method characterized by the steps of:
preparing a binder-free suspension (21) of electrode material particles (11) in a volatile suspending agent (13), said particles substantially having a size within the nanometer scale,
depositing the binder-free particle suspension (21) on a substrate (22) covered with a conducting film,
removing the suspending agent (31) by evaporation, and
compressing the particles to form an electrically conducting and mechanically stable nanostructured porous film.

2. The method according to claim 1, characterized in that the step of preparing the suspension comprises the step of adding electrode material particles of a semi-conducting material to the suspending agent.

3. The method according to claim 2, characterized in that the step of adding electrode material particles of a semi-conducting material to the suspending agent comprises the step of selecting the semi-conducting material of the group consisting of $TiO_2$, $ZnO$, $Nb_2O_5$, $ZrO_2$ and $SnO_2$.

4. The method according to claim 2, characterized in that the electrode material added to the suspending agent consists of particles having a size substantially in the range of 10–100 nanometer, while a portion of up to about 1% by weight have a particle size in the range of 1–10 μm.

5. The method according to claim 2, characterized in that the step of adding electrode material particles of a semi-conducting material to the volatile suspending agent comprises the step of selecting the suspending agent from the group consisting of ethanol, methanol, acetone and water.

6. The method according to claim 1, characterized in that the step of depositing the particle suspension on a substrate covered with a conducting film comprises the step of selecting the substrate material from the group consisting of glass and plastic.

7. The method according to claim 1, characterized in that the step of compressing the particles comprises the step of applying a pressure in the range of 100 to 1000 $kg/cm^2$ on the particles deposited on the conducting substrate.

8. The method according to claim 1, characterized in that the step of compressing the particles comprises the step of applying a pressure of 500 $kg/cm^2$ on the particles deposited on the conducting substrate.

9. The method according to claim 1, characterized in that the step of compressing the particles comprises the step of applying the pressure with a planar pressure tool.

10. The method according to claim 1, characterized in that the step of compressing the particles comprises the step of feeding a substrate between two cooperating pressure rollers, said pressure rollers providing the pressure necessary to form the electrically conducting and mechanically stable nanostructured porous film.

11. The method according to claim 9, characterized in that the step of compressing the particles comprises compressing with a tool being provided with a relief pattern, said pattern thereby being transferred to the nanostructured porous film produced during the compressing step.

12. The method according to claim 1, wherein said removing the suspended agent by evaporation step is performed subsequent to said depositing the binder-free suspension step and prior to any heating step.

13. The method according to claim 1, wherein the porous film has a porosity in the range of approximately 50–60%.

14. A method of manufacturing a nanostructured porous film electrode, comprising the steps of:
preparing a binder-free suspension of electrode material particles in a volatile suspending agent, said particles substantially having a size within the nanometer scale,
depositing the binder-free particle suspension on a substrate covered with a conducting film,
subsequent to said depositing step and prior to any heating step, removing the suspending agent by evaporation, thereby leaving a particle layer on said substrate and
compressing the particle layer to form an electrically conducting and mechanically stable nanostructured porous film.

15. The method according to claim 14, wherein the porous film has a porosity in the range of approximately 50–60%.

16. A method of manufacturing a nanostructured porous film electrode, comprising the steps of:
preparing a binder-free suspension of electrode material particles in a volatile suspending agent, said particles substantially having a size within the nanometer scale, depositing the binder-free particle suspension on a substrate covered with a conducting film, removing the suspending agent by evaporation, thereby leaving a particle layer on said substrate and compressing the particle layer to form an electrically conducting and mechanically stable nanostructured porous film, wherein all manufacturing steps between said depositing step and said compressing step are conducted at room temperature.

17. The method according to claim 16, wherein the porous film has a porosity in the range of approximately 50–60%.

* * * * *